Patented Dec. 16, 1930

1,785,660

UNITED STATES PATENT OFFICE

KARL STREITWOLF, OF FRANKFORT-ON-THE-MAIN, AND ALFRED FEHRLE, OF BAD-SODEN-ON-THE-TAUNUS, GERMANY, ASSIGNORS TO WINTHROP CHEMICAL COMPANY, INC., OF NEW YORK, N. Y., A CORPORATION OF NEW YORK

THIOSEMICARBAZONES OF HYDROXY ARSENOBENZENES AND PROCESS OF PREPARING THE SAME

No Drawing. Application filed July 11, 1928, Serial No. 292,020, and in Germany July 21, 1927.

The present process relates to thio-semicarbazones from arsenophenol-aldehydes and -ketones and to a process of preparing them.

The semicarbazones of the hydroxy-aldehyde-arsenobenzenes and hydroxy-ketone-arsenobenzenes which are used for therapeutic purposes are in the form of their phenolates in aqueous solution highly unstable. They decompose already on standing for a short time, which decomposition manifests itself when their solution begins to become turbid.

We have now made the surprising discovery that, unlike the phenolates above referred to the phenolates of the corresponding thio-semicarbazones possess an extremely great stability. The aqueous solutions of these new phenolates can be left in the air in open vessels for a number of days without the solutions becoming turbid in the least. This difference in the property of the above mentioned two kinds of phenolates manifests itself distinctly when their solutions are titrated by means of hydrochloric acid until the alkaline reaction towards phenolphthalein has disappeared. For instance, while the sodium salt of 4.4'-arseno-3.3'-dihydroxy-benzaldehyde-semicarbazone becomes turbid even on addition of only a small quantity of hydrochloric acid despite the fact that the solution still shows a strongly alkaline reaction towards phenolphthalein the solution of the corresponding thio-derivative becomes only turbid immediately before the disappearance of the alkaline reaction towards phenolphthalein.

The said remarkable difference in the properties of the sulfur-free and the sulfurized semicarbazones could not be expected and the enhanced stability of the latter involves an important advantage in using them for therapeutical purposes.

The new compounds in question may be prepared either by subjecting the corresponding hydroxy-aldehyde-arsonic acids and oxyketone-arsonic acids to the action of thio-semicarbazones and converting the thio-semicarbazone-arsonic acids thus obtained into the arseno compounds by means of a reducing agent, or by first reducing the aldehyde- and ketone-arsonic acids into the corresponding arseno compounds, then treating the latter with thio-semicarbazide. In order to obtain the phenolates, the arseno-hydroxythio-semicarbazones thus produced are finally transformed in the usual manner into their sodium salts which may be separated, if required, by a suitable precipitant.

The thio-semicarbazones are yellow to yellowish-red colored bodies; they melt with decomposition and readily dissolve in aqueous caustic alkalies with formation of the respective alkali metal salts, the so-called phenolates. The latter are yellow to brownish-red colored bodies and readily soluble in water. Their aqueous solutions show an alkaline reaction and they are much more stable than the solutions of the corresponding carbazones which contain no sulfur.

The following examples serve to illustrate our invention but they are not intended to limit it thereto:

1. Preparation of thio-semicarbazone of 1.1'-diformyl-3.3'-dihydroxyarsenobenzene of the formula:

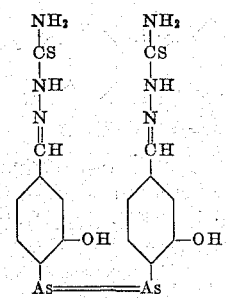

24 grams of 3-hydroxybenzaldehyde-thiosemicarbazone-4-arsonic acid of the formula:

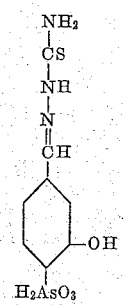

obtained by treating 3-hydroxy-benzaldehyde-4-arsonic acid with thio-semicarbazide, are dissolved in 500 ccm. of alcohol while gently heating and adding 46 ccm. of alcoholic hydrochloric acid of 35 per cent strength, whereupon the resulting solution is filtered and cooled. There are then added, while agitating and cooling, 180 ccm. of hypophosphorous acid of 25 per cent strength and 2 ccm. of hydriodic acid (D=1,7) whereupon the yellow arseno compound soon separates. After having allowed the product to stand for several hours, it is filtered by suction, washed with alcohol and ether and dried in a vacuum. Its conversion into the phenolate is effected by dissolving 10,8 grams of the arseno-phenol in 60 ccm. of 2 N. caustic soda solution and separating the sodium salt by means of alcohol.

An identical product is obtained by first reducing the aldehyde-arsonic acid into the arsenobenzene and subjecting then the latter to the action of thio-semicarbazone.

The thio-semicarbazone of 1.1'-diformyl-3.3'-dihydroxy-arsenobenzene is yellow colored, begins to change its color at about 165° C., then gradually sinters and melts at about 218° C. with decomposition. The sodium salt which is obtainable therefrom is yellow colored and dissolves in water with alkaline reaction.

2. Preparation of thio-semicarbazone of 1.1'-diformyl-2.2'-diamino-3.3'-dihydroxy-arsenobenzene of the formula:

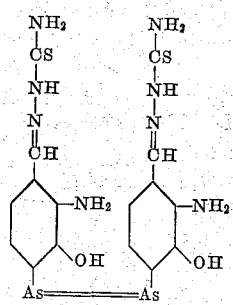

10 grams of 2-amino-3-hydroxybenzaldehyde-thio-semicarbazone-4-arsonic acid, obtained by reduction of 2-nitro-3-hydroxy-benzaldehyde-thio-semicarbazone-4-arsonic acid, are dissolved, while gently heating in 190 ccm. of alcohol with 20 ccm. of 6 N. alcoholic hydrochloric acid. This solution is cooled and mixed, while shaking, with 65 ccm. of hypophosphorous acid of 25 per cent strength and 0,6 ccm. of hydriodic acid (D=1,7). The clear solution soon becomes turbid and the arsenobenzene separates. The solution is allowed to stand for several hours during which time it is repeatedly shaken, and the product is then filtered by suction, washed with alcohol and ether and dried in vacuum. 6 grams of the arsenobenzene thus obtained are dissolved in 36 ccm. of 2 N. caustic soda solution. On addition of 120 ccm. of alcohol the sodium salt separates which is washed with alcohol and ether and dried in vacuo.

3. Preparation of thio-semicarbazone of 1.1'-diformyl-2.2'-dichlor-3.3'-dihydroxyarsenobenzene of the formula:

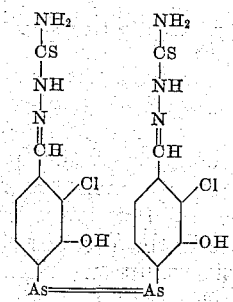

14 grams of 2-chlor-3-hydroxy-benzaldehyde-thio-semicarbazone-4-arsonic acid, produced by subjecting 2-chlor-3-hydroxybenzaldehyde-4-arsonic acid to the action of thio-semicarbazide, are dissolved in 250 ccm. of alcohol with 30 ccm. of 6 N. alcoholic hydrochloric acid and into the solution, after it has been cooled, are introduced, while stirring, 80 ccm. of hypophosphorous acid of 25 per cent strength and 1 ccm. of hydriodic acid (D=1,7). After having allowed the mixture to stand for several hours, the arsenobenzene which has formed is filtered off by suction, washed with alcohol and ether and converted into the sodium salt by dissolving it in 70 ccm. of 2 N. caustic soda solution and precipitating with 250 ccm. of alcohol.

4. Preparation of thio-semicarbazone of 1.1'-dihydroxy-2.2'-diacetyl-arsenobenzene of the formula:

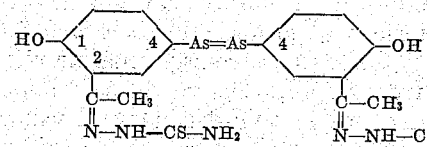

13 grams of thio-semicarbazone of 1-hydroxy-2-acetylbenzene-4-arsonic acid are dissolved in 200 ccm. of alcohol and 15 ccm. of 6 N. alcoholic hydrochloric acid. To this solution is added a mixture of 40 ccm. of hypophosphoric acid of 50 per cent strength and 1 ccm. of hydriodic acid (D=1,7) and the whole is allowed to stand over night at room temperature. The precipitate which is formed is the thio-semicarbazone of 1.1'-dihydroxy-2.2'-diacetyl-arsenobenzene which is filtered by suction, washed with alcohol and ether and dried. In order to convert the thio-semicarbazone into its sodium salt it is dissolved in 50 ccm. of 2 N. caustic soda solution and filtered. This solution is mixed by stirring with 600 ccm. of alcohol and the resulting precipitate is filtered by suction, washed with alcohol and ether and dried. In this manner the sodium compound of the thio-semicarbazone is obtained in the form of a yellow powder which readily dissolves in water.

5. Preparation of thio-semicarbazone of 1.1'-dihydroxy-2.2'-diacetyl-6.6'-diamino-4.4'-arsenobenzene of the formula:

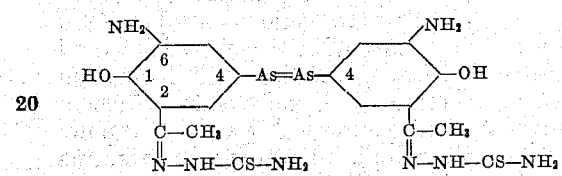

11,5 grams of thio-semicarbazone of 1-hydroxy-2-acetyl-6-aminobenzene-4-arsenic acid are dissolved in 200 ccm. of water and 12 ccm. of 5 N. caustic soda solution, then mixed with a solution of 52 grams of sodium hydrosulfite in 200 ccm. of water and heated for one hour to 60–65° C. The arsenobenzene which separates is filtered by suction, washed with water, dissolved in 30 ccm. of 2 N. caustic soda solution and precipitated by introducing it into alcohol while stirring. The resulting sodium compound is washed with alcohol and ether and dried in vacuo.

As an equivalent of the process described in the following claims is to be regarded the process which comprises the steps of reducing the hydroxyaldehyde- and hydroxyketone-arsonic acids into arseno compounds, then converting the latter by the action of thio-semicarbazide into the thio-semicarbazones and finally preparing therefrom the sodium compounds.

We claim:

1. The new process which comprises causing benzenearsonic acids of the general formula:

wherein one X stands for OH and one X for

Y representing H or alkyl, and the other X stand for H, $NH_2$ or halogen to react with thio-semicarbazide and transforming the resulting thio-semicarbazones of the benzenearsonic acids into the corresponding arsenobenzenes by treating them with a reducing agent.

2. The new process which comprises causing benzenearsonic acid of the general formula:

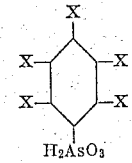

wherein one X stands for OH and one X for

Y representing H or alkyl, and the other X stand for H, $NH_2$ or halogen to react with thio-semicarbazide and transforming the resulting thio-semicarbazones of the benzenearsonic acids into the corresponding arsenobenzenes by treating them with a reducing agent and finally preparing an alkali metal salt from the said arsenobenzenes.

3. The new process which comprises causing benzenearsonic acids of the general formula:

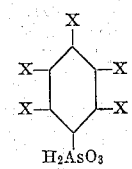

wherein one X stands for OH, one X for

and the other X for H, $NH_2$ or halogen, to react with thio-semicarbazide, then converting the resulting thio-semicarbazones of the benzenearsonic acids into the corresponding arsenobenzenes by treating them with a reducing agent and finally preparing an alkali metal salt from the said arsenobenzenes.

4. The new process which comprises causing benzenearsonic acids of the general formula:

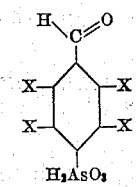

wherein one X stands for OH and the other X for H, $NH_2$ or halogen, to react with thio-semicarbazide, then converting the resulting thio-semicarbazones of the benzenearsonic acids into the corresponding arsenobenzenes by treating them with a reducing agent and finally preparing an alkali metal salt from the said arsenobenzenes.

5. The new process which comprises causing benzenearsonic acids of the general formula:

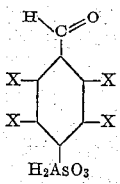

wherein one X stands for OH and the other X for H, NH$_2$ or halogen, to react with thio-semicarbazide, then converting the resulting thio-semicarbazones of the benzenearsonic acids into the corresponding arsenobenzenes by treating them with hypophosphorous acid and hydriodic acid and finally preparing an alkali metal salt from the said arsenobenzenes.

6. The new process which comprises causing 3-hydroxy-1-benzaldehyde-4-arsonic acids of the formula:

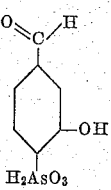

to react with thio-semicarbazide, then transforming the resulting thio-semicabazone into the corresponding arsenobenzene by treating it with hypophosphorous acid and hydriodic acid and finally preparing an alkali metal salt from the said arsenobenzene.

7. As new products the thio-semicarbazones of hydroxy-arsenobenzenes of the general formula:

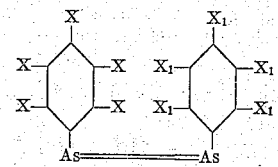

wherein one X and the corresponding X$_1$ stand for OH, one X and the corresponding X$_1$ for

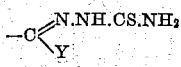

Y being H or alkyl, and the other X and the corresponding X$_1$ stand for H, NH$_2$, or halogen, said new products being yellow to yellowish-red colored bodies which melt with decomposition and readily dissolve in alkalies with formation of the respective alkali metal salts which in the dry state are yellow to brownish-red powders, readily soluble in water with alkaline reaction.

8. As new products, the thio-semicarbazones of hydroxy-arsenobenzenes having the general formula:

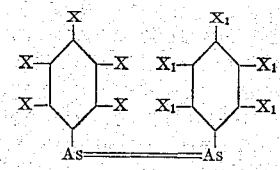

wherein one X and the corresponding X$_1$ stand for OH, one X and the corresponding X$_1$ for

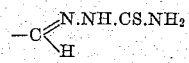

and the other X and the corresponding X$_1$ stand for H, NH$_2$ or halogen, said new products being yellow to yellowish-red colored bodies which melt with decomposition and readily dissolve in alkalies with formation of the respective alkali metal salts which in the dry state are yellow to brownish-red powders, readily soluble in water with alkaline reaction.

9. As new products, the thio-semicarbazones of hydroxy-arsenobenzenes having the general formula:

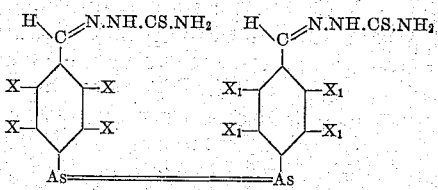

wherein one X and the corresponding X$_1$ stand for OH and the other X and the corresponding X$_1$ for H, NH$_2$ or halogen, said new products being yellow to yellowish-red colored bodies which melt with decomposition and readily dissolve in alkalies with formation of the respective alkali metal salts which in the dry state are yellow to brownish-red powders, readily soluble in water with alkaline reaction.

10. As a new product, the thio-semicarbazone of 1.1'-diformyl-3.3'-dihydroxy-arsenobenzene, having the formula:

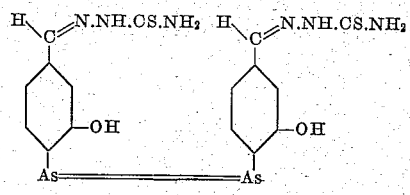

which product is yellow colored, begins to change its color at about 165° C., then gradually sinters and melts at about 218° C. with decomposition, dissolving in aqueous sodium hydroxide with formation of the sodium salt which is yellow colored and dissolves in water with alkakline reaction.

In testimony whereof, we affix our signatures.

KARL STREITWOLF.
ALFRED FEHRLE.